Figure 1:
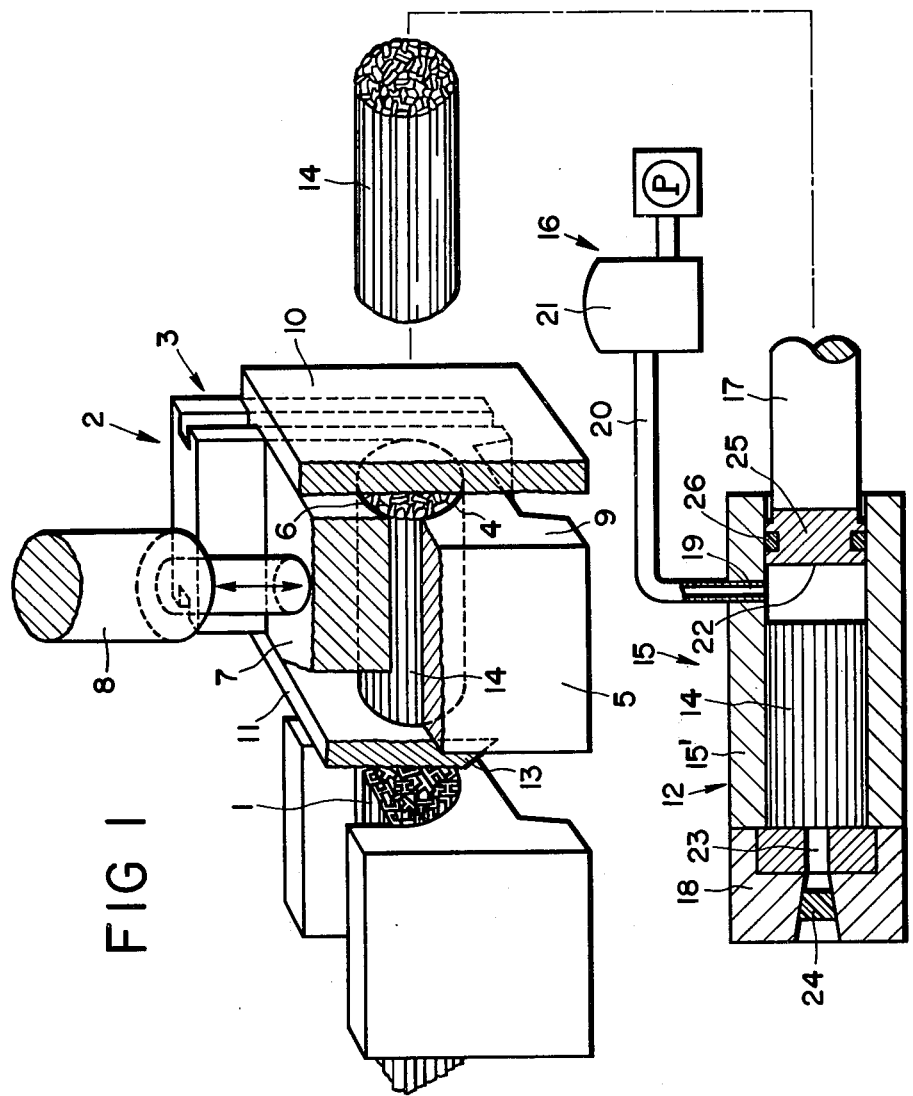

United States Patent [19]

Takahashi et al.

[11] 4,033,024

[45] July 5, 1977

[54] METHOD FOR PRODUCING EXTRUDED STRUCTURAL PROFILES FROM SCRAP MATERIALS OF ALUMINUM BASED METAL

[75] Inventors: Toshiro Takahashi; Toshihiro Nagano; Katsuhiko Nakamura, all of Shizuoka; Masaru Kikuchi, Fuji; Kazuo Suzuki, Shizuoka, all of Japan

[73] Assignee: Riken Keikinzoku Kogyo Kabushiki Kaisha, Shizuoka, Japan

[22] Filed: June 25, 1975

[21] Appl. No.: 590,289

[30] Foreign Application Priority Data

June 14, 1975 Japan .............................. 50-72156

[52] U.S. Cl. .......................... 29/403; 29/DIG. 47; 29/419 R; 72/253 R; 72/256
[51] Int. Cl.² .................... B21C 23/04; B23P 7/00
[58] Field of Search ............. 29/403, 420.5, 180 E, 29/192 R, DIG. 47, 419; 72/253, 270, 256, 38

[56] References Cited

UNITED STATES PATENTS

| 2,211,984 | 8/1940 | Paterson | 29/403 |
|---|---|---|---|
| 2,358,667 | 9/1944 | Stern | 29/403 |
| 2,391,752 | 12/1945 | Stern | 29/403 |
| 3,394,213 | 7/1968 | Roberts et al. | 29/419 |
| 3,523,354 | 8/1970 | Loewenstein | 29/419 |
| 3,626,578 | 12/1971 | Price et al. | 29/403 |
| 3,629,929 | 12/1971 | Wessel | 29/420.5 |
| 3,701,190 | 10/1972 | Stone, Jr. | 29/419 |
| 3,757,410 | 9/1973 | Roberts | 29/420.5 |
| 3,894,677 | 7/1975 | La Iacona | 29/419 |

FOREIGN PATENTS OR APPLICATIONS

| 1,066,977 | 10/1959 | Germany | 72/261 |
|---|---|---|---|
| 1,927,225 | 12/1969 | Germany | 72/261 |

*Primary Examiner*—Lowell A. Larson
*Assistant Examiner*—Daniel C. Crane
*Attorney, Agent, or Firm*—Finnegan, Henderson, Farabow & Garrett

[57] ABSTRACT

Method for producing extruded structural profiles from aluminum or aluminum alloy scrap materials. The scrap materials are compacted under room temperature or under heat suitable for hot extrusion into a cylindrical body which is of such a dimension that is suitable for insertion into an extruder. The compacted body has an average density which is 70 to 86 percent of that of aluminum, and includes longitudinal air passages. Suction pressure is applied to the interior of the extruder during extruding process for removing air entrapped in the body, which may otherwise cause voids in the extruded products.

11 Claims, 2 Drawing Figures

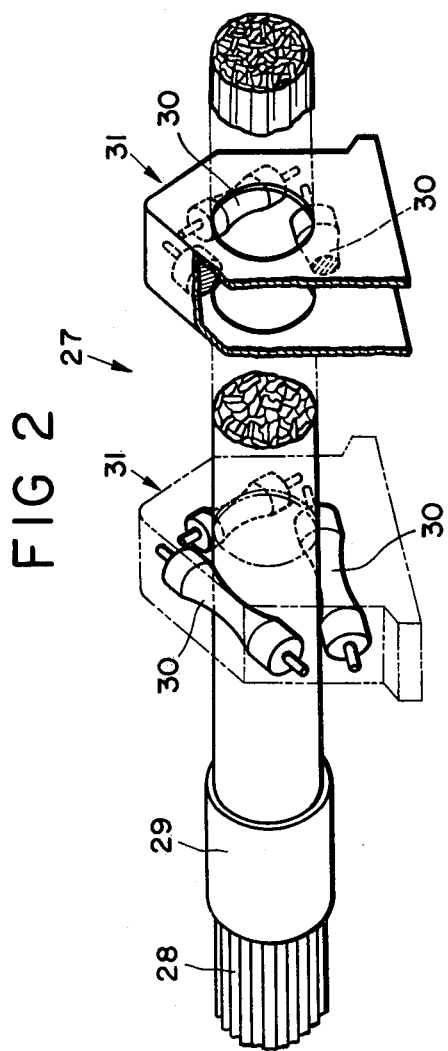

METHOD FOR PRODUCING EXTRUDED STRUCTURAL PROFILES FROM SCRAP MATERIALS OF ALUMINUM BASED METAL

The present invention relates to a method for producing extruded structural profiles from aluminum or aluminum alloy scrap materials. More particularly, the present invention relates to a method in which scrap materials are extruded while they are subjected to suction pressure.

Aluminum and aluminum alloy (hereinafter simply referred to as "aluminum based metal") are being widely used in various fields of art since they light in weight and possess a corrosion resistant property and a relatively high mechanical strength. Particularly, aluminum based metals are widely used in the form of extruded structural profiles for buildings or the like. As the production of aluminum extrusions increases, there is also a remarkable increase in the amount of scrap materials such as wastes produced during extrusion process and small metal pieces produced during machining and assembling processes. It is believed that the amount of such scrap materials is as large as 20 to 30 percent of the billet weight and there is a desire for effective recovery of such scrap materials.

Hithertofore, scrap materials of aluminum based metal have been recovered by melting them with virgin aluminum material. However, the known process is disadvantageous in respect of metal loss and power consumption.

A proposal has therefore been made to recover aluminum based scrap materials without employing melting process. For example, the U.S. Pat. No. 2,302,980 issued to Max Stern on Nov. 24, 1942 discloses a process in which chips of aluminum based metal are compressed under heat to form an aluminum briquette. Further, the U.S. Pat. No. 2,391,752 issued also to Max Stern on Dec. 25, 1945 discloses a process in which aluminum based metal chips are heated a temperature of approximately 300° C, and then compressed under a pressure of 3 to 8 ton/in$^2$ to form a compacted body which is then heated to a temperature of approximately 350° to 450° C and extruded into a desired form. Thus, the prior art teaches to recover scrap materials of aluminum based metal by compressing the materials under a high temperature to form a compacted body and extrude the compacted material under a hot extrusion temperature. Thus, the prior art does not employ a step for melting the materials.

The concepts of forming briquettes or extrusions from chips of aluminum based metal as taught in the United States patents cannot be applied to a process for recovering scrap materials which are produced during extrusion process or in machining and assembling operations. Such scrap materials usually have various cross-sectional configurations and are approximately 30 to 200 cm long so that they must be divided into small chips in order that the known processes are applied.

However, it is practically impossible to divide such scrap materials of various cross-sectional configurations into small chips unless a very complicated expensive apparatus is used because the aluminum based metal is so soft that it has a tendency of adhering to cutting blades and wide varieties of thickness and width inhibits formation of chips of uniform dimension. Even when it is tried to extrude scrap materials under a high temperature by inserting them into an extruder housing in the form as they are, it is impossible to charge a desired amount of materials for producing an extrusion of desired length through a single extruding stroke. Further, air is extrapped in gaps among the scrap materials and forms voids and rough surfaces in the extruded profiles. The discrepancy also causes a decrease in mechanical strength of the final product.

The present invention has therefore an object to provide a mehod for forming extruded structural profiles from scrap materials of aluminum based metal.

Another object of the present invention is to provide a method for gathering scrap materials of aluminum based metal into a cylindrical form and extruding them while they are subjected to suction pressure.

A further object of the present invention is to provide a method for extruding scrap materials of aluminum based metal without dividing them into chips.

According to the present invention, in order to accomplish the above and other objects, there is provided a method for producing extruded structural profiles from scrap materials of aluminum based metal, said method comprising steps of bundling the scrap materials to form a substantially cylindirical body which is capable of being inserted into an extruder housing, heating the body to a hot extrusion temperature, inserting the heated body into the extruder housing, applying a suction pressure to the interior of the housing and extruding the body into a structural profile of desired cross-section.

According to the feature of the present invention, relatively long scrap materials are bundled to form a cylindrical configuration suitable for extrusion and the cylindrical body of the scrap materials is subjected to a suction pressure during extrusion process. Therefore, any adverse effect of entrapped air can be eliminated. The extruded products in accordance with the present invention are free from voids and have smooth surfaces. Further, the products have high mechanical strength. Since relatively long scrap materials are piled one on the other, it is possible to charge a desired amount of material into the extruder. In the cylindrical body of so gathered scrap materials, there sre formed continuous longitudinal air passages which enhance degasing effect.

The above and other objects and features of the present invention will become apparent from the following descriptions of preferred embodiments taking reference to the accompanying drawings, in which:

FIG. 1 is a diagrammatical perspective view which shows steps for forming a compacted cylindrical body from elongated scrap materials of aluminum based metal and extruding the compacted body by an extruder; and FIG. 2 is a perspective view showing an alternative example of apparatus for forming a cylindrical body of scrap materials.

Referring now to the drawings, particularly to FIG. 1, scrap materials 1 of aluminum based metal are provided by cutting them into a suitable length. The materials thus provided are cleaned in accordance with a known process to remove oil, organic materials and other foreign materials from the surfaces thereof.

The cleaned materials are then transferred to a shaping station 2 where they are formed into a cylindrical body having an average density of 70 to 86 percent of the density of aluminum. The scrap materials may be heated to a temperature above 300° C before they are transferred to the shaping station 2, or the cylindrical body may be heated to a hot extrusion temperature after shaping.

In the shaping station 2, there is disposed a shaping device 3 which includes a stationary anvil 5 having a recess 4 of semi-circular cross-section and a movable punch 7 having a recess 6 of semicircular cross-section for co-operation with the recess 4. The punch 7 is connected with a driving device 8 for driving it in vertical direction between a lifted position and a lowered position. The punch 7 has an end plate 10 secured to one end wall thereof. The end plate 10 is so arranged that it slides along an adjacent end wall 9 of the anvile 5. To the other end wall of the punch 7, there is secured another end plate 11 which is adapted to slide along the other end wall of the anvil 5. The end plate 11 is provided at its lower side with a cutting edge 13 for cutting the scrap materials into lengths suitable for insertion into an extruder. The end plate 10 has such a vertical dimension that, when the punch 7 is in the lifted position, it still covers the adjacent end of the recess 4.

In operation, the punch 7 is moved upwardly to the lifted position so that the lower edge of the end plate 11 is moved apart from the adjacent end wall of the anvil 5. The cleaned scrap materials 1 are then inserted into the recess 4 longitudinally until the leading ends of the materials abut the end plate 10 which still covers the adjacent end of the recess 4. Thereafter, the punch 7 is lowered to cut the scrap materials 1 at the cutting edge 13 on the end plate 11 and at the same time compress the scrap material 1 in the recess 4 with a suitable pressure, preferably exceeding 80 kg/cm². Thus, the scrap materials are compacted into a cylindrical body having a density of 70 to 86 percent of that of aluminum. The compacted cylindrical body is constituted by scrap materials which are adhered together in a self-sustaining body, but includes continuous and longitudinal air passages. There is no possibility that the scrap materials are separated from each other during transportation of the compacted body from one station to another. Further, as will be fully described later, the longitudinal air passages enhance degassing effect during extruding process. When the scrap materials are heated to a temperature of 300° to 400° C before they are compacted, a pressure of 80 to 700 kg/cm² may be applied thereto in the compacting process. When the scrap materials are compacted under a room temperature, a pressure of 150 to 1000 kg/cm² may be applied to obtain a compacted body having an average density of 70 to 86 percent of the density of aluminum.

The compacted cylindrical body 14 thus formed is then transferred to an extruding station 15 where the body 14 is maintained at a temperature suitable for hot extrusion and inserted into the housing 15 of an extruder 12. Then, the housing 15 is subjected to a suction pressure which is applied thereto by a vacuum device 16 so that the pressure in the housing 15 is decreased to 20 to 60 mmHg. Thereafter, an extruding ram 17 is actuated to extrude the materials through a die 18 into a desired cross-sectional configuration.

The extruder 12 shown in FIG. 1 includes an opening 19 formed in the wall of the extruder housing 15 at the rearward portion thereof. The opening 19 is connected through a pipe 20 and a vacuum tank 21 with a vacuum pump P. The die 18 is mounted on the front end of the extruder housing 15.

With the ram 17 removed from the extruder housing 15, the heated and compacted cylindrical body 14 is inserted into the housing 15. Then, the ram 17 is inserted into the housing 15 to a position where the opening 19 is still opened to the interior of the housing 15. The die opening 23 of the die 18 is suitably plugged as shown by 24 to seal the interior of the housing 15 so that it is in a closed condition. A suitable sealing member 26 is provided to provide an air-tight seal around the ram 17. Then, the vacuum device 16 is operated to apply to the interior of the housing 15 a suction pressure which is preferably as low as 20 to 60 mmHg. Then, the operation of the vacuum device 16 is stopped and the ram 17 is advanced to extrude the cylindrical body 14 into a desired cross-sectional configuration. Since the compacted cylindrical body includes longitudinally extending air passages so that the interior of the body can be positively degased.

FIG. 2 shows another example of the device for forming a compacted cylindrical body. The device 27 includes a hollow tubular guide 29 for passing a bundle 28 of scrap materials therethrough, and a plurality of sets of roller assemblies 31 each including three rollers 30. The bundle 28 of scrap materials which has passed through the guide 28 is compacted step by step as it passes through each of the roller assemblies to form a compacted cylindrical body having a configuration which is suitable for insertion into the extruder housing and also having an average density which is 70 to 86 percent of the density of aluminum. The continuous cylindrical body thus formed is cut into a suitable length. In this device, the pressure applied to the scrap materials is adjusted by changing the positions of the rollers. In the illustrated device, each roller assembly includes three rollers arranged in triangular configuration but other roller arrangements may of course be employed.

EXAMPLE I

Aluminum scrap materials are cut into lengths of approximately 360 mm and cleaned by dipping them into 6% water solution of NaOH and after water rinsing dipping into a bath of 10% water solution of $HNO_3$ for 1 minute. The cleaned scrap materials are then heated to a temperature of 400° C and compacted under the pressure of 270 kg/cm² to form a cylindrical body of 175 mm in diameter and 360 mm in length. The compacted body had an average density of 78 percent of the density in aluminum. The compacted cylindrical body is then subjected to a suction pressure of approximately 50 mmHg and extruded. The extrusion thus obtained had the tensile strength greater than 20 kg/mm², the 0.2% yield point greater than 15 kg/mm² and elongation greater than 8%.

EXAMPLE II

Scrap materials are cleaned as in the Example I and subjected to a pressure of 540 kg/cm² applied from a press machine to form a compacted cylindrical body which is substantially the same in configuration and density with that in Example I. Then, the cylindrical body is heated to a temperature of approximately 400° C and extruded under the same condition as in Example I to form an extrusion which has mechanical properties substantially the same as those in Example I.

The invention has thus been shown and described with reference to preferable embodiments, however, it should be noted herein that the invention is in no way limited to the details of the illustrated examples but changes and modifications may be made without departing from the scope of the appended claims.

We claim:

1. A method for producing extruded structural profiles from elongated lengths of scrap materials of aluminum base metal which comprises the steps of mechanically compressing the lengths of scrap materials under pressure applied in a direction transverse to their length to form a self-sustaining, compacted and coherent substantially cylindrical body of scrap materials capable of being inserted into an extruder housing, said body having air passages extending in a longitudinal direction along its length between the lengths of material and opening to the exterior of said body, heating the body to a hot extrusion temperature, inserting the heated body into the extruder housing, applying suction to the interior of the extruder housing when in a closed condition to evacuate air from said air passages, and extruding the body from said housing through a die opening into a structural profile of the desired cross-section.

2. The method of claim 1 which includes the step of cutting the bundled scrap materials so that the coherent cylindrical body has a predetermined length facilitating easy handling.

3. Method in accordance with claim 1 in which the bundled scrap materials are compacted together by passing them through forming roll means.

4. Method in accordance with claim 1 in which said cylindrical body has an average density which is greater than 70 percent of that of aluminum.

5. Method in accordance with claim 4 in which said cylindrical body has an average density which is between 70 and 86 percent of that of aluminum.

6. Method in accordance with claim 1 in which the scrap materials are subjected to a compacting pressure exceeding 80 kg/cm$^2$ to form the cylindrical body.

7. Method in accordance with claim 1 in which said scrap materials are compacted while they are heated to a temperature greater than 300° C to form said cylindrical body, said body being then extruded while it is still hot.

8. Method in accordance with claim 1 in which said scrap materials are compacted under room temperature to form the cylindrical body which is then extruded after being heated to a temperature of about 400° to 500° C.

9. Method in accordance with claim 1 in which the interior of the extruder housing is subjected to a suction pressure of below 60 mmHg during extruding process.

10. A method for producing extruded structural profiles from elongated lengths of scrap materials of extruded structural profiles of aluminum based material, said method comprising the steps of mechanically compacting the scrap materials to form a self-sustaining substantially coherent body, capable of being inserted into an extruder, by applying pressure exceeding about 80 kg/cm$^2$ in a direction transverse to the scrap lengths under a temperature greater than about 300° C, said body having air passages extending along its longitudinal length between the lengths of the scrap materials and opening to the exterior of said body, heating the body to a temperature of about 400° to 500° C, inserting the heated body into the extruder, applying a suction pressure of below 60 mm Hg to the interior of the extruder when in a closed condition to evacuate air from said passages, and extruding the body from said housing through a die opening into a structural profile having the desired cross-section.

11. A method for producing extruded structural profiles from elongated lengths of scrap materials of aluminum base metal which comprises the steps of bundling the lengths of scrap materials into a substantially cylindrical shaped mass, compressing the cylindrically shaped mass of scrap materials together to form a self-sustaining, coherent compacted cylindrical body by applying pressure to the bundled elongated lengths in a direction transverse to their longitudinal direction, said body having air passages extending in a longitudinal direction along its length between the lengths of material and opening to the exterior of said body, heating the body to a hot extrusion temperature, inserting the heated body into the extruder housing, applying suction to the interior of the extruder housing when in a closed condition to evacuate air from said passages, and extruding the body from said housing through a die opening into a structural profile of the desired cross-section.

* * * * *